(12) United States Patent
Xu et al.

(10) Patent No.: US 11,120,840 B2
(45) Date of Patent: Sep. 14, 2021

(54) INFORMATION PROCESSING METHOD AND ELECTRONIC DEVICE

(71) Applicant: Lenovo (Beijing) Co., Ltd., Beijing (CN)

(72) Inventors: Xiao Xu, Beijing (CN); Dakun Yang, Beijing (CN); Jingxian Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/830,700

(22) Filed: Mar. 26, 2020

(65) Prior Publication Data
US 2020/0312375 A1     Oct. 1, 2020

(30) Foreign Application Priority Data
Mar. 27, 2019   (CN) .......................... 201910240008.8

(51) Int. Cl.
*G11B 27/34*     (2006.01)
(52) U.S. Cl.
CPC .................................. *G11B 27/34* (2013.01)

(58) Field of Classification Search
CPC ...................................................... G11B 27/34
See application file for complete search history.

(56) References Cited

U.S. PATENT DOCUMENTS

| 2008/0154962 A1* | 6/2008 | Yu ....................... G11B 27/3027 |
| 2010/0287508 A1* | 11/2010 | Kim ........................ G06F 16/43 |
| | | 715/835 |

FOREIGN PATENT DOCUMENTS

| CN | 104301795 A | 1/2015 |
| CN | 107577768 A | 1/2018 |
| CN | 108965922 A | 12/2018 |
| CN | 109002812 A | 12/2018 |
| WO | 2012173724 A1 | 12/2012 |

* cited by examiner

*Primary Examiner* — Mishawn N. Hunter
(74) *Attorney, Agent, or Firm* — Anova Law Group, PLLC

(57) ABSTRACT

An information processing method comprising: obtaining environment information of a video file in a preview state, where the preview state is a display state before the video file is played; in response to the environment information satisfying a first pre-set condition, indicating the video file by a first cover; and in response to the environment information satisfying a second pre-set condition, indicating the video file by a second cover.

16 Claims, 5 Drawing Sheets

Obtaining environment information of a video file in a preview state — 101

If the environment information satisfies a first pre-set condition, indicating the video file by a first cover, and if the environment information satisfies a second pre-set condition, indicating the video file by a second cover — 102

INFORMATION PROCESSING METHOD AND ELECTRONIC DEVICE

CROSS-REFERENCES TO RELATED APPLICATIONS

This application claims the priority of Chinese Patent Application No. 201910240008.8, filed on Mar. 27, 2019, the entire content of which is incorporated herein by reference.

FIELD OF THE DISCLOSURE

The present disclosure generally relates to the field of electronics and information technology and, more particularly, relates to an information processing method and an electronic device.

BACKGROUND

When using an electronic device, a user often watches videos on the electronic device. Before opening a video file, the electronic device displays a video cover of the video file to the user such that the user knows the gist of the video by seeing the video cover. However, in the related technology, the video cover displayed on the electronic device is unable to serve this purpose.

BRIEF SUMMARY OF THE DISCLOSURE

One aspect of the present disclosure provides an information processing method. The method includes: obtaining environment information of a video file in a preview state, where the preview state is a display state before the video file is played; in response to the environment information satisfying a first pre-set condition, indicating the video file by a first cover; and in response to the environment information satisfying a second pre-set condition, indicating the video file by a second cover.

Another aspect of the present disclosure provides an electronic device. The electronic device includes: a memory for storing program instructions; and a processor coupled with the memory through a communication bus and configured to: obtain environment information of a video file in a preview state, where the preview state is a display state before the video file is played; in response to the environment information satisfying a first pre-set condition, indicate the video file by a first cover; and in response to the environment information satisfying a second pre-set condition, indicate the video file by a second cover.

Another aspect of the present disclosure provides a computer readable medium. The computer readable medium containing program instructions, when executed by one or more processors, the program instructions perform a method comprising: obtaining environment information of a video file in a preview state, where the preview state is a display state before the video file is played; in response to the environment information satisfying a first pre-set condition, indicating the video file by a first cover; and in response to the environment information satisfying a second pre-set condition, indicating the video file by a second cover.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION

To describe the technical solutions more clearly and more completely, the embodiments of the present disclosure will be described with reference to the drawings. The described embodiments are only some but not all of the embodiments of the present disclosure. Based on the embodiments of the present disclosure, other embodiments obtained by a person of ordinary skill in the art without creative efforts shall fall within the protection scope of the present disclosure.

It should be understood that "the embodiment of the present disclosure" or "the foregoing embodiment" mentioned throughout the specification means that a feature, structure, or characteristic related to the embodiment is included in at least one embodiment of the present disclosure. Therefore, "in the embodiment of the present disclosure" or "in the foregoing embodiment" appearing throughout the specification does not necessarily refer to the same embodiment. Further, the features, the structures, or the characteristics may be combined in any suitable manner in one or more embodiments. In various embodiments of the present invention, the value of the sequence number of each process does not mean the order of the execution. The execution order of each process should be determined by the function and internal logic rather than the implementation processes of various embodiments of the present disclosure. The sequence numbers are only for describing information and do not represent the merits or demerits of the embodiments.

Figure 1:
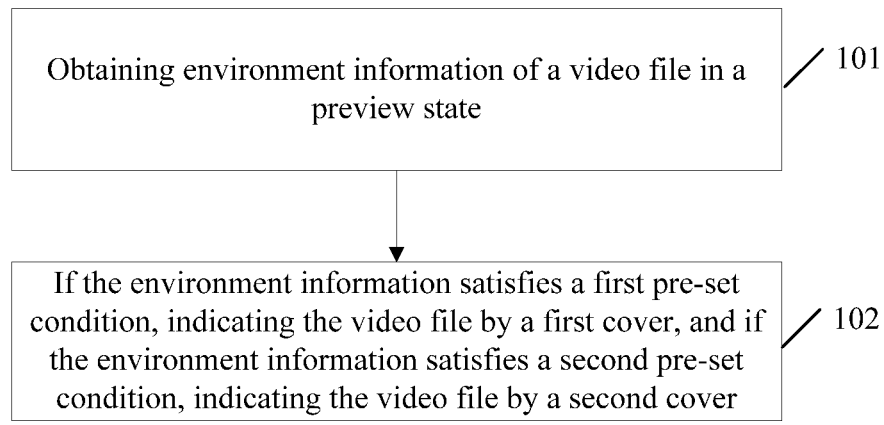
FIG. 1 illustrates a flowchart of an example of an information processing method according to some embodiments of the present disclosure.

The present disclosure provides an information processing method applied to an electronic device. As shown in FIG. 1, at 101, environment information of a video file in a preview state is obtained.

The preview state is a display state before the video file is played. In the preview state, the video file is displayed in a form of a video cover. After the electronic device receives an operation by a user on the video cover, the electronic device controls the video file to enter a play state. In some embodiments, the video cover is displayed statically. For example, the video cover does not change when it is displayed. In some other embodiments, the video cover is display dynamically. For example, the video cover changes when it is displayed. That is, the video cover plays a plurality of image frames in a pre-set time period, such that after the user views the plurality of image frames, the user can learn the content or key information of the video file.

The video cover includes at least one of a video identifier, a capturing time of the video file, a video category, a number of views, a number of comments (e.g., a number of bullet screens), a video length in time, a video resolution, a video rating, or a video file save path. Further, the video cover includes a video highlight or a video tag, etc.

The electronic device consistent with the present disclosure may be any device capable of data processing, such as a mobile phone, a tablet computer, a notebook computer, a personal digital assistant (PDA), a portable media player, a navigation device, a wearable device, a smart bracelet, a pedometer, a digital television, or a desktop computer.

The environment information includes first environment information. The first environment information includes a video file folder containing the video file. The video file folder includes a file folder name and path information of the file folder. The path information is used to indicate which application program opens the video file. The application program includes a video program, a file management program or an image database. For example, the video program can be a Tencent video program, a Youku video program, or an iQiyi video program, etc., which is not limited by the present disclosure.

The environment information also includes second environment information. The second environment information includes at least one of current location information, a movement status, audio information, or scene information of the electronic device displaying the video file. The location information is used to indicate the location where the electronic device is currently located. Further, the electronic device can determine whether the user is at home, work place, or other location based on the obtained location information. The movement status is used to indicate movement of the user. Further, the electronic device can determine whether the user is not moving, walking, or running. In some embodiments, the audio information is used to indicate current emotion information of the user. After the electronic device receives the audio information of the user, the electronic device analyzes the audio information to determine whether the user is calm or emotional. In some embodiments, the audio information can also indicate a noise level around the electronic device. In some embodiments, the electronic device obtains the scene information of the electronic device by photographing images and analyzing the photographed images to determine whether the user is shopping, staying at home or riding a subway.

The environment information also includes third environment information. The third environment information includes an operating state of the electronic device. The third environment information is used to indicate how often or how fast the user operates the electronic device. For example, after obtaining a rapid sliding speed at which the user performs a sliding operation on a display screen of the electronic device, the electronic device determines that the user is in an anxious mood or an irritated mood at the time. In this case, to sooth the user's mood, the electronic device may display simple and peaceful video covers.

The environment information also includes fourth information. The fourth information includes attribute information of the video file. The attribute information includes time information and/or type information. In some embodiments, the attribute information may also include at least one of the capturing time of the video file, the video category, the number of views, the number of comments, the video length in time, the video resolution, the application program that opens the video file, the video rating, or the video file save path.

In some embodiments, the environment information includes at least one of the first environment information, the second environment information, the third environment information, or the fourth environment information.

In some embodiments, the environment information includes, for example, the scene information and the file folder information. That is, obtaining the environment information of the video file in the preview state includes obtaining the scene information and the file folder information of the video file in the preview state. In some other embodiments, obtaining the environment information of the video file in the preview state includes obtaining the scene information or the file folder information of the video file in the preview state, or previously described other information. After obtaining other information of the video file in the preview state, determining the video cover is similar to the embodiment in which the environment information includes the scene information and the file folder information. The detail description is omitted.

At 102, if the environment information satisfies a first pre-set condition, the video file is indicated by a first cover, and if the environment information satisfies a second pre-set condition, the video file is indicated by a second cover. The first pre-set condition and the second pre-set condition are different. The first cover and the second cover may be the same or different.

In some embodiments, the environment information is determined to satisfy the first pre-set condition if the scene information of the video file in the preview state matches a first pre-set scene and the file folder information matches a first pre-set file folder. The environment information is determined to satisfy the second pre-set condition if the scene information of the video file in the preview state matches a second pre-set scene and the file folder information matches a second pre-set file folder. In this case, the first pre-set scene and the second pre-set scene are different, and the first pre-set file folder and the second pre-set file folder are different.

In some embodiments, indicating the video file by the first cover includes displaying the first cover in the preview state of the video file, and indicating the video file by the second cover includes displaying the second cover in the preview state of the video file.

The information processing method consistent with the present disclosure is described in detail for a particular application. The electronic device obtains the scene information and the file folder information of the video file in the preview state. In some embodiments, the scene information indicates that the user is at home. The file folder information indicates that the user can open the video file in an entertainment-type file folder. The video file in the preview state is indicated by the first cover. The first cover is a cover indicating a warm and entertainment style. As such, the user can view the warm and entertainment style video cover. In some other embodiments, the scene information indicates that the user is riding the subway. The file folder information indicates that the user can open the video file in a history-type file folder. The video file in the preview state is indicated by the second cover. Because the subway is noisy, the electronic device displays a simple and history style video cover. In these embodiments, both the first cover and the second cover are the video cover of the video file.

In the information processing method consistent with the embodiments of the present disclosure, the environment information of the video file in the preview state is obtained. If the environment information satisfies the first pre-set condition, the video file is indicated by the first cover. If the environment information satisfies the second pre-set condition, the video file is indicated by the second cover. Because the video cover is determined based on the environment information of the video file, the cover of the video file can express information corresponding to the current environment information. Thus, the video cover can be displayed intuitively, thereby solving the problem that the video cover displayed by the electronic device is not intuitive.

Figure 2:
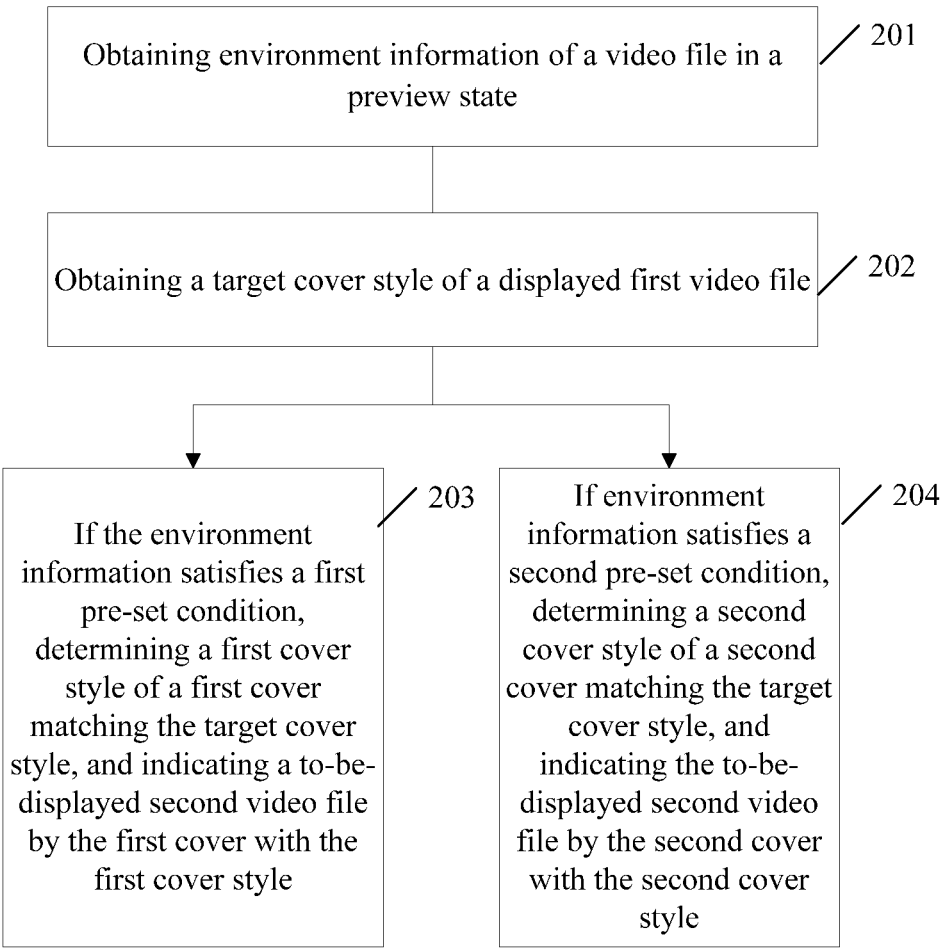
FIG. 2 illustrates a flowchart of another example of an information processing method according to some embodiments of the present disclosure.

The present disclosure further provides another information processing method applied to an electronic device. As shown in FIG. 2, at 201, environment information of a video file in a preview state is obtained.

In some embodiments, the preview state is a display state before the video file is played. The environment information includes at least one of a file folder of the video file, scene information of the electronic device used to display the video file, an operating state of the electronic device, or attribute information of the video file. The attribute information includes time information and/or type information.

At 202, a target cover style of a first video file displayed by the electronic device is obtained.

The video cover of the first video file displayed by the electronic device is analyzed to obtain the target cover style. For example, the electronic device currently displays six video files to a user. The electronic device analyzes the six video files to obtain the video cover styles of the six video files, respectively. In one example, if five out of the six video covers include at least one animation element respectively, the target cover style is determined to be an animation style. In another example, if six out of the six video covers include at least one history element respectively, the target cover style is determined to be a history style. The electronic device may determine the video cover style based on the color, element, or other attribute information.

At 203, if the environment information satisfies a first pre-set condition, the electronic device determines a first cover style of a first cover matching the target cover style, and indicates a to-be-displayed second video file by the first cover with the first cover style.

After the electronic device determines the target cover style, the electronic device processes the video cover of the to-be-displayed video file according to the target cover style, and indicates the to-be-displayed video file by the first cover with the first cover style. As such, after a sliding operation by the user on the electronic device for displaying the second video file is received, the first cover matching the target cover style is displayed. For example, after six out of the six video covers include at least one history element respectively, the to-be-displayed video file can be indicated by the first cover with the history style. Thus, when the electronic device displays the second video file, the second video file is indicated by the first cover with the history style.

At 204, if the environment information satisfies a second pre-set condition, the electronic device determines a second cover style of a second cover matching the target cover style, and indicates the to-be-displayed second video file by the second cover with the second cover style.

The first cover and the second cover may be the same or different, which is not limited by the present disclosure.

It should be noted that the embodiment includes descriptions of the same processes and the same contents as previously described other embodiments. The descriptions of the previously described other embodiments may be referred and are not repeated herein.

In the information processing method consistent with the embodiments of the present disclosure, the target cover style of the displayed first video file is obtained. The to-be-displayed second video file is indicated by the cover with the cover style matching the target cover style. Thus, the video covers may be displayed with a uniform cover style.

Figure 3:
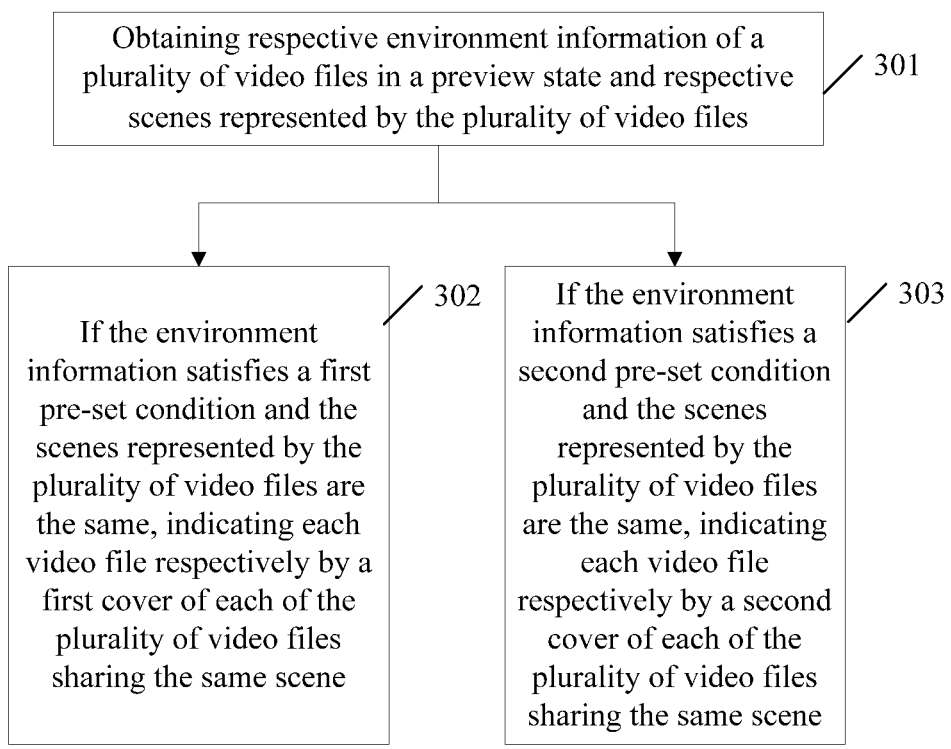
FIG. 3 illustrates a flowchart of another example of an information processing method according to some embodiments of the present disclosure.

The present disclosure further provides another information processing method applied to an electronic device. As shown in FIG. 3, at 301, the electronic device obtains respective environment information of a plurality of video files in a preview state and respective scenes represented by the plurality of video files.

In some embodiments, the respective environment information of the plurality of video files in the preview state includes scene information of the electronic device including the plurality of video files or scene information of the electronic device retrieving the plurality of video files. For example, after a user launches the Tencent video application program, the electronic device often does not store video files. At this time, the electronic device retrieves the video files from a server storing the video files through the Tencent video application program.

At 302, if the environment information satisfies a first pre-set condition and the scenes represented by the plurality of video files are the same, the electronic device indicates each video file respectively by a first cover of each of the plurality of video files sharing the same scene.

In some embodiments, the scenes represented by the plurality of video files are determined to be the same after the electronic device analyzes the plurality of video files and determines that the plurality of video files share the same scene. Then, the electronic device indicates each video file respectively by the first cover of each of the plurality of video files sharing the same scene. In one example, each video file retrieved by the electronic device includes at least one showcase and at least one cultural relic element. It indicates that the plurality of video files is captured in a museum scene. As such, the electronic device indicates each video file respectively by the first cover of each of the plurality of video files with a history style. In another example, the electronic device obtains respective location information of each of the plurality of video files at the time of capturing and based on a scene location included in the location information (e.g., the popular tourist scene West Lake), indicates each video file respectively by the first cover of each of the plurality of video files with a romantic style.

At 303, if the environment information satisfies a second pre-set condition and the scenes represented by the plurality of video files are the same, the electronic device indicates each video file respectively by a second cover of each of the plurality of video files sharing the same scene.

It should be noted that the embodiment includes descriptions of the same processes and the same contents as previously described other embodiments. The descriptions of the previously described other embodiments may be referred and are not repeated herein.

In the information processing method consistent with the embodiments of the present disclosure, after the scenes represented by the plurality of video files are determined to be the same, each video file is respectively indicated by the first cover of each of the plurality of video files sharing the same scene. When one story or one scene is captured by the plurality of video files, the plurality of video files in the preview state is indicated respectively by the covers representing the same story or the same scene, thereby unifying the video covers. Thus, the video covers may be displayed with a uniform cover style.

Figure 4:
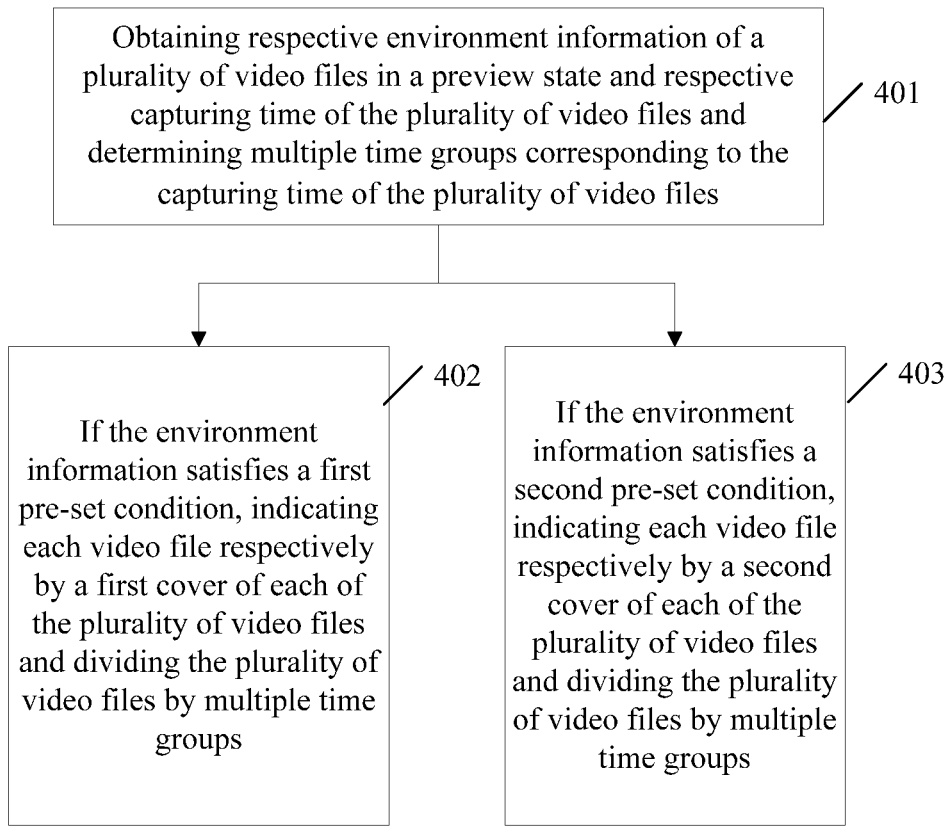
FIG. 4 illustrates a flowchart of another example of an information processing method according to some embodiments of the present disclosure.

The present disclosure further provides another information processing method applied to an electronic device. As shown in FIG. 4, at 401, the electronic device obtains respective environment information of a plurality of video files in a preview state and respective capturing time of the plurality of video files, and determines multiple time groups corresponding to the capturing time of the plurality of video files.

In some embodiments, the electronic device divides the plurality of video files into multiple time groups. For example, the capturing time of three video files are Mar. 20, 2019, Mar. 20, 2019, and Mar. 24, 2019, respectively. Two time groups of Mar. 20, 2019 and Mar. 24, 2019 can be determined. In addition, the plurality of video files can be grouped by month, quarter, or year, which are not limited by the present disclosure.

When indicating the plurality of video files by the video covers in multiple time groups, the plurality of video files are displayed chronologically within each time group.

At 402, if the environment information satisfies a first pre-set condition, the electronic device indicates each video file respectively by a first cover of each of the plurality of video files and divides the plurality of video files by multiple time groups.

At 403, if the environment information satisfies a second pre-set condition, the electronic device indicates each video file respectively by a second cover of each of the plurality of video files and divides the plurality of video files by multiple time groups.

It should be noted that the embodiment includes descriptions of the same processes and the same contents as previously described other embodiments. The descriptions of the previously described other embodiments may be referred and are not repeated herein.

In the information processing method consistent with the embodiments of the present disclosure, the plurality of video files is indicated respectively by the covers shown according to multiple time groups. Because the plurality of video files is shown according to the time groups, the user can quickly find a desired video file according to the time groups.

Figure 5:
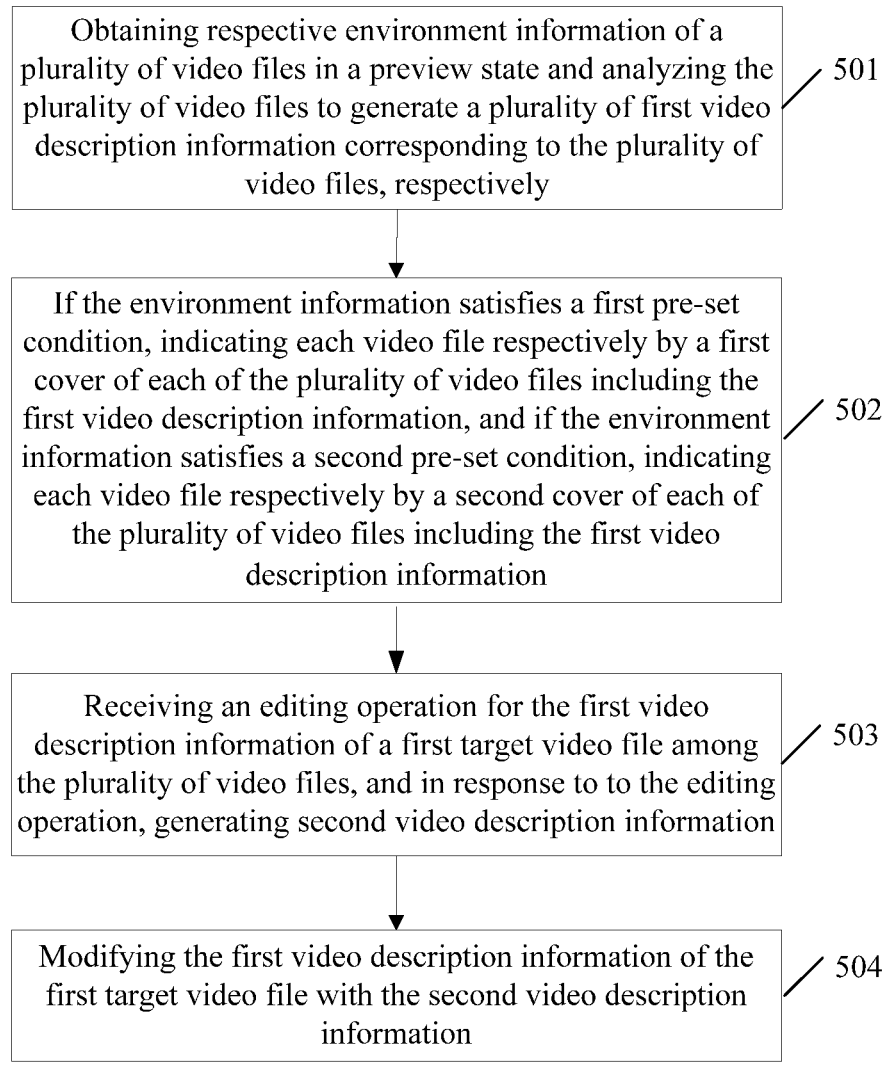
FIG. 5 illustrates a flowchart of another example of an information processing method according to some embodiments of the present disclosure.

The present disclosure further provides another information processing method applied to an electronic device. As shown in FIG. 5, at 501, the electronic device obtains respective environment information of a plurality of video files in a preview state and analyzes the plurality of video files to generate a plurality of first video description information corresponding to the plurality of video files, respectively.

Each first video description information describes the content of a corresponding video file.

In some embodiments, the electronic device obtains a target amount of image frames and corresponding audio information for each of the plurality of video files respectively and analyzes the target amount of the image frames and corresponding audio information to obtain the first video description information for each of the plurality of video files respectively.

The first video description information may be a text describing the corresponding video file. For example, for a video file about touring the West Lake, the first video description information can be the text "West Lake tour". The first video description information may be a text describing certain aspect of the video file. For example, the video file is searched for currently trending social network terms. After a particular term is found in the video file (e.g., "Pan Ta" meaning "rubbing it"), the first video description information may be determined to be that particular term (e.g., "Pan Ta"). The trending terms can be updated periodically or in real time to include the most recent trending terms on the internet.

At 502, if the environment information satisfies a first pre-set condition, the electronic device indicates each video file respectively by a first cover of each of the plurality of video files including the first video description information, and if the environment information satisfies a second pre-set condition, the electronic device indicates each video file respectively by a second cover of each of the plurality of video files including the first video description information.

In some embodiments, the process 502 may include processes A1 through A4 described below.

At A1, based on the first video description information, the electronic device determines a video label for the corresponding video file.

The video label includes one or more keywords briefly describing the corresponding video file. For example, the video file is about touring West Lake. Correspondingly, the video label may include "West Lake" and "Vacation".

Each video label includes at least one video type. The present disclosure does not limit the number of the video types described by each video label. If the video file includes more characteristic information, the video label includes more video types. If the video file includes less characteristic information, the video label includes less video types.

At A2, based on the video type of each of the plurality of video files, the electronic device determines the video category for the corresponding video file.

In some embodiments, the video label includes "West Lake" and "Vacation". The video file about touring West Lake is determined to belong to "West Lake" and "Vacation" categories. In some other embodiments, multiple video categories are pre-configured, such as vacation, work, study, short videos, family, and the like. Because "Vacation" in the video label of the video file about touring West Lake corresponds to the pre-configured vacation category, the video file is determined to be the vacation category. The number of the video categories in one video file and the number of the video types in the video label of the same video file may be the same or different. For example, the video file includes two video types such as vacation and short videos. The video file belongs to not only the vacation category but also the short videos category.

At A3, if the environment information satisfies a first pre-set condition, the electronic device indicates each video file by a first cover of each of the plurality of video files including first video description information, and divides the plurality of video files into groups according to the video category of each video file.

The process A3 further includes processes A31 and A32. At A31, the electronic device obtains the capturing time of each of a plurality of third video files divided into different video categories and determines a time sub-category corresponding to the capturing time of the plurality of third video files.

In some embodiments, the plurality of third video files are divided into different groups according the video category of each of the plurality of third video files. The plurality of third video files may be divided into different groups by date, month, quarter, or year to determine the time sub-category. Further, the plurality of third video files may be displayed chronologically within each time sub-category.

At A32, if the environment information satisfies a first pre-set condition, the electronic device indicates each video file by a first cover of each of the plurality of third video files including first video description information, and divides the plurality of third video files into groups according to the video category and the time sub-category of each of the plurality of third video files.

In some embodiments, the first video description information is displayed below the first cover without overlapping with the first cover. In some other embodiments, the first video description information is displayed over the first cover. That is, the first video description information is displayed on the first cover, for example, at the center of the first cover or at periphery of the first cover. In addition, the first video description information may be displayed in different fonts for different video types. For example, the font can be Song-font or Kai-font for the history video type or the news video type. The font can be artistic font or handwritten font for the entertainment video type.

At A4, if the environment information satisfies a second pre-set condition, the electronic device indicates each video file by a second cover of each of the plurality of video files including the first video description information, and divides the plurality of video files into groups according to the video category.

In some embodiments, the process A4 may be implemented as follows. If the environment information satisfies the second pre-set condition, the electronic device indicates each video file by the second cover of each of the plurality of third video files including the first video description information, and divides the plurality of third video files into groups according to the video category and the time sub-category.

In some embodiments, the process 502 may include processes B1 and B2 described below.

At B1, based on the first video description information, the electronic device determines a video label for the corresponding video file.

Each video label includes at least one video type.

At B2, if the environment information satisfies the first pre-set condition, the electronic device indicates each video file by the first cover of each of the plurality of video files including the first video description information and the video label. If the environment information satisfies the second pre-set condition, the electronic device indicates each video file by the second cover of each of the plurality of video files including the first video description information and the video label.

In some embodiments, the electronic device not only displays the video cover corresponding to the video file, but also displays the first video description information and the video label corresponding to the video file, thereby assisting the user to quickly find the desired video file.

In some embodiments, after the process B2, the electronic device may further perform processes B3 through B5.

At B3, the electronic device receives a pre-configured operation for the video label of a second target video file among the plurality of video files, and in response to the pre-configured operation, determines a target video type based on the video label.

The pre-configured operation may be an operation that the user clicks on the video label.

At B4, based on the target video type, the electronic device extracts a target video cover corresponding to the target video type from the second target video file.

The electronic device may extract the target video cover from the image frames of the second target video file. The resolution of the target video cover is greater than a pre-set resolution.

At B5, the electronic device modifies the video cover of the second target video file with the target video cover.

The electronic device may perform the processes B1 and B2 or the processes B1 through B5.

After the user determines that the user does not want the type of certain video cover displayed by the electronic device, the user may perform the operation on the video type included in the video label to replace the video cover displayed by the electronic device. As such, the user gets the desired video cover for displaying on the electronic device.

The process A1 or the process B1 may further include processes C1 through C4.

At C1, the electronic device obtains a classifier including multiple video types, and extracts feature information from a plurality of video files.

At C2, the electronic device classifies the feature information with the classifier to obtain multiple first labels corresponding to the plurality of video files, respectively.

Each first label includes at least one first video type.

At C3, if the first label corresponding to a third target video file among the plurality of video files matches the first video description information of the third target video file, the electronic device determines that the first label is the video label of the third target video file.

At C4, if the first label corresponding to the third target video file among the plurality of video files does not match the first video description information of the third target video file, the electronic device modifies the first label corresponding to the third target video file with the first video description information of the third target video file to obtain a second label, and determines that the second label is the video label of the third target video file.

The second label includes at least one second video type. The second label and the first label corresponding to the third target video file are different.

In some embodiments, after the process 502, the electronic device further performs the following processes.

At 503, the electronic device receives an editing operation for the first video description information of a first target video file among the plurality of video files, and in response to the editing operation, generates second video description information.

At 504, the electronic device modifies the first video description information of the first target video file with the second video description information.

The electronic device may perform the processes 501 and 502 or the processes 501 through 504.

It should be noted that the embodiment includes descriptions of the same processes and the same contents as previously described other embodiments. The descriptions of the previously described other embodiments may be referred and are not repeated herein.

In the information processing method consistent with the embodiments of the present disclosure, if the environment information satisfies the first pre-set condition, each video file is indicated by the first cover including the first video description information. If the environment information satisfies the second pre-set condition, each video file is indicated by the second cover including the first video description information. As such, when the video file is displayed, not only the video cover but also the first video description information is displayed too. The video file is displayed with relevant information, thereby assisting the user to quickly find the desired video file based on the first video description information.

Figure 6:
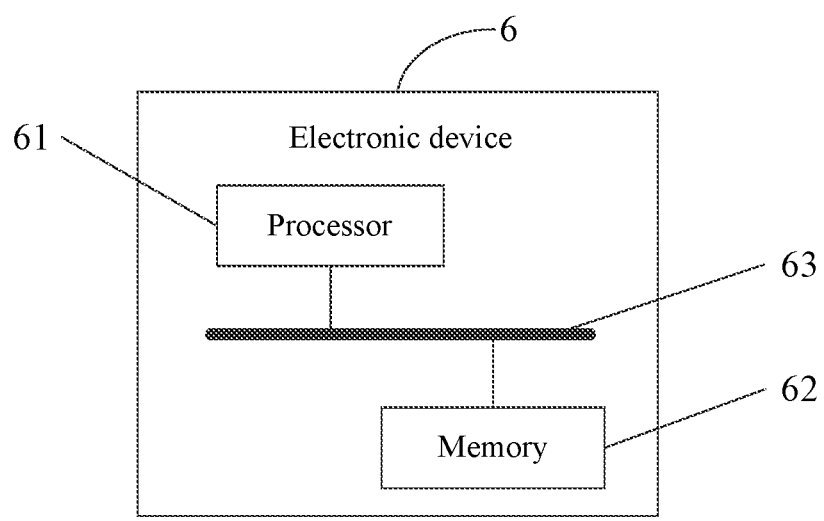
FIG. 6 illustrates a structural diagram of an example of an electronic device according to some embodiments of the present disclosure.

The present disclosure further provides an electronic device 6. The electronic device 6 may be applied to any information processing method provided in the embodiments shown in FIGS. 1-5. As shown in FIG. 6, the electronic device 6 includes: a processor 61, a memory 62, and a communication bus 63. The communication bus 63 connects between the processor 61 and the memory 62.

The processor 61 is configured to execute program instructions stored in the memory 62 for implementing the information processing method consistent with the present disclosure. The processor 61 is configured to: obtain environment information of a video file in a preview state, where the preview state is a display state before the video file is played; if the environment information satisfies a first pre-set condition, indicate the video file by a first cover; and if the environment information satisfies a second pre-set condition, indicate the video file by a second cover.

In some embodiments, the processor 61 is configured to execute the program instructions stored in the memory 62 for implementing the process of indicating the video file by the first cover if the environment information satisfies the first pre-set condition and indicating the video file by the second cover if the environment information satisfies the second pre-set condition. As such, the processor 61 is configured to: obtain a target cover style of a first video file displayed the electronic device; if the environment information satisfies the first pre-set condition, determine a first cover style of a first cover matching the target cover style and indicate a to-be-displayed second video file by the first cover with the first cover style; and if the environment information satisfies the second pre-set condition, determine a second cover style of a second cover matching the target cover style and indicate the to-be-displayed second video file by the second cover with the second cover style.

The environment information includes at least one of a video file folder containing the video file, scene information of the electronic device displaying the video file, an operating state of the electronic device, or attribute information of the video file. The attribute information includes time information and/or type information.

In some embodiments, the processor 61 is configured to execute the program instructions stored in the memory 62 for implementing the process of obtaining the environment information of the video file in the preview state. The processor 61 is configured to: obtain respective environment information of a plurality of video files in the preview state and respective scenes represented by the plurality of video files.

Correspondingly, the processor 61 is configured to execute the program instructions stored in the memory 62 for implementing the process of indicating the video file by the first cover if the environment information satisfies the first pre-set condition and indicating the video file by the second cover if the environment information satisfies the second pre-set condition. The processor 61 is configured to: indicate each video file respectively by the first cover of each of the plurality of video files sharing the same scene if the environment information satisfies the first pre-set condition and the scenes represented by the plurality of video files are the same, and indicate each video file respectively by the second cover of each of the plurality of video files sharing the same scene if the environment information satisfies the second pre-set condition and the scenes represented by the plurality of video files are the same.

In some embodiments, the processor 61 is configured to execute the program instructions stored in the memory 62 for implementing the process of obtaining the environment information of the video file in the preview state. The processor 61 is configured to: obtain respective environment information of the plurality of video files in the preview state and respective capturing time of the plurality of video files, and determine multiple time groups corresponding to the capturing time of the plurality of video files.

Correspondingly, the processor 61 is configured to execute the program instructions stored in the memory 62 for implementing the process of indicating the video file by the first cover if the environment information satisfies the first pre-set condition and indicating the video file by the second cover if the environment information satisfies the second pre-set condition. The processor 61 is configured to: indicate each video file respectively by the first cover of each of the plurality of video files if the environment information satisfies the first pre-set condition and divide the plurality of video files by multiple time groups, and indicate each video file respectively by the second cover of each of the plurality of video files if the environment information satisfies the second pre-set condition and divide the plurality of video files by multiple time groups In some embodiments, the processor 61 is configured to execute the program instructions stored in the memory 62 for implementing the process of obtaining the environment information of the video file in the preview state. The processor 61 is configured to: obtain respective environment information of the plurality of video files in the preview state and analyze the plurality of video files to generate a plurality of first video description information corresponding to the plurality of video files, respectively. Each first video description information describes the content of a corresponding video file.

Correspondingly, the processor 61 is configured to execute the program instructions stored in the memory 62 for implementing the process of indicating the video file by the first cover if the environment information satisfies the first pre-set condition and indicating the video file by the second cover if the environment information satisfies the second pre-set condition. The processor 61 is configured to: indicate each video file respectively by the first cover of each of the plurality of video files including the first video description information if the environment information satisfies the first pre-set condition, and indicate each video file respectively by the second cover of each of the plurality of video files including the first video description information if the environment information satisfies the second pre-set condition.

Correspondingly, the processor 61 is configured to execute the program instructions stored in the memory 62 for implementing the information processing method consistent with the present disclosure. The processor 61 is configured to: receive an editing operation for the first video description information of a first target video file among the plurality of video files and in response to the editing operation, generate second video description information; and modify the first video description information of the first target video file with the second video description information.

In some embodiments, the processor 61 is configured to execute the program instructions stored in the memory 62 for implementing the process of indicating each video file respectively by the first cover of each of the plurality of video files including the first video description information if the environment information satisfies the first pre-set condition, and indicating each video file respectively by the second cover of each of the plurality of video files including the first video description information if the environment information satisfies the second pre-set condition. The processor 61 is configured to: determine a video label for each video file based on the first video description information thereof; determine the video category for each video file based on the video type of each of the plurality of video files; indicate each video file by the first cover of each of the plurality of video files including the first video description information if the environment information satisfies the first pre-set condition, and divide the plurality of video files into groups according to the video category of each video file; and indicate each video file by the second cover of each of the plurality of video files including the first video description information if the environment information satisfies the second pre-set condition, and divide the plurality of video files into groups according to the video category of each video file.

In some embodiments, the processor 61 is configured to execute the program instructions stored in the memory 62 for implementing the process of indicating each video file respectively by the first cover of each of the plurality of video files if the environment information satisfies the first pre-set condition and dividing the plurality of video files by multiple time groups. The processor 61 is configured to: obtain the capturing time of each of a plurality of third video files divided into different video categories and determine a time sub-category corresponding to the capturing time of the plurality of third video files; indicating each video file by the first cover of each of the plurality of third video files including the first video description information if the environment information satisfies the first pre-set condition, and divide the plurality of third video files into groups according to the video category and the time sub-category of each of the plurality of third video files.

Correspondingly, the processor 61 is configured to execute the program instructions stored in the memory 62 for implementing the process of indicating each video file by the second cover of each of the plurality of video files including the first video description information if the environment information satisfies the second pre-set condition, and dividing the plurality of video files into groups according to the video category of each video file. The processor 61 is configured to: indicate each video file by the second cover of each of the plurality of third video files including the first video description information if the environment information satisfies the second pre-set condition, and divide the plurality of third video files into groups according to the video category and the time sub-category of each of the plurality of third video files.

In some embodiments, the processor 61 is configured to execute the program instructions stored in the memory 62 for implementing the process of indicating each video file respectively by the first cover of each of the plurality of video files including the first video description information if the environment information satisfies the first pre-set condition, and indicating each video file respectively by the second cover of each of the plurality of video files including the first video description information if the environment information satisfies the second pre-set condition. The processor 61 is configured to: determine a video label for each video file based on the first video description information, where each video label includes at least one video type; and indicate each video file by the first cover of each of the plurality of video files including the first video description information and the video label if the environment information satisfies the first pre-set condition and indicating each video file by the second cover of each of the plurality of video files including the first video description information and the video label if the environment information satisfies the second pre-set condition.

Correspondingly, the processor 61 is configured to execute the program instructions stored in the memory 62 for implementing the information processing method consistent with the present disclosure. The processor 61 is configured to: receive a pre-configured operation for the video label of a second target video file among the plurality of video files, and in response to the pre-configured operation, determine a target video type based on the video label; extract a target video cover corresponding to the target video type from the second target video file based on the target video type; and modify the video cover of the second target video file with the target video cover.

In some embodiments, the processor 61 is configured to execute the program instructions stored in the memory 62 for implementing the process of determining the video label for each video file based on the first video description information. The processor 61 is configured to: obtain a classifier including multiple video types and extract feature information from the plurality of video files; classify the feature information with the classifier to obtain multiple first labels corresponding to the plurality of video files, where each first label includes at least one first video type; if the first label corresponding to a third target video file among the plurality of video files matches the first video description information of the third target video file, determine that the first label is the video label of the third target video file; and if the first label corresponding to the third target video file among the plurality of video files does not match the first video description information of the third target video file, modify the first label corresponding to the third target video file with the first video description information of the third target video file to obtain a second label and determine that the second label is the video label of the third target video file. The second label includes at least one second video type. The second label and the first label corresponding to the third target video file are different.

It should be noted that the detail description for implementing the processes performed by the processor consistent with the present disclosure may be referred to the description of the information processing method provided in the embodiments shown in FIGS. 1-5, and is omitted herein.

In the electronic device consistent with the embodiments of the present disclosure, the environment information of the video file is obtained. If the environment information satisfies the first pre-set condition, the video file is indicated by the first cover. If the environment information satisfies the second pre-set condition, the video file is indicated by the second cover. Because the video cover is determined based on environment information of the video file, the cover of the video file reflects information matching the current scene. As such, the video cover is displayed with relevant information, thereby avoiding the problem of irrelevant video cover being displayed by the electronic device in the related technology.

The present disclosure further provides a computer-readable storage medium. The computer storage medium stores one or more computer programs. The one or more computer programs may be executed by one or more processors to implement any of the processes of the information processing method consistent with the present disclosure.

The processor includes at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, or a microprocessor. The processor may be another electronic component having a processor function. The processor is not limited by the present disclosure.

The computer-readable storage medium/memory includes at least one of a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic storage medium, an optical disk, or a compact disk read-only memory (CD-ROM). The computer-readable storage medium may also be various terminals including one or any combination of the above memories, such as mobile phones, computers, tablet devices, and personal digital assistants, etc.

It should be noted that in the specification, terms such as "including", "comprising", or any other variation thereof are intended to encompass non-exclusive inclusion, such that a process, a method, an article, or a device that includes a series of elements includes not only these elements but also those not explicitly listed or other elements inherent to the process, the method, the article, or the device. Without further restrictions, the elements defined by the sentence "including a . . . " do not exclude the existence of other identical elements in the process, the method, the article, or the device.

The sequence numbers of the embodiments of the present disclosure are only for describing information, and do not represent merit or demerit of the embodiments.

Through the description of the foregoing embodiments, those skilled in the art can clearly understand that the method in the foregoing embodiments can be implemented in software together with general-purpose hardware or in hardware only. However, in most cases, the former is preferred. Based on such understanding, the essential portion of the technical solution of the present disclosure or the contribution in addition to the existing technology can be embodied in the form of a software product. The computer software product stored in a storage medium (such as ROM/RAM, magnetic disk, CD-ROM) includes a plurality of program instructions causing a terminal device (such as a mobile phone, a computer, a server, an air conditioner, and a network device) to perform the processes of the information processing method provided by the embodiments of the present disclosure.

The method, the device (system), and the computer program product provided by the embodiments of the present disclosure are described with reference to the flowcharts and/or block diagrams. The computer program instructions are executed to perform the processes of the flowcharts and/or the functions of the block diagrams or the combinations thereof. The computer program instructions instruct the processor of a general-purpose computer, a special-purpose computer, an embedded computer, or other programmable data processing device to produce a machine, such that the computer program instructions are executed by the processor of the computer or other data processing device to produce a device for implementing one or more processes of the flowcharts and/or one or more functions of the block diagrams.

The computer program instructions may also be stored in the computer-readable storage medium for instructing the computer or other programmable data processing device to operate in certain way, such that the computer program instructions stored in the computer-readable storage medium produce a manufacture including an instruction apparatus. The instruction apparatus implements the functions specified in one or more processes of the flowcharts and/or one or more function blocks of the block diagrams.

The computer program instructions may be loaded onto the computer or other programmable data processing device to cause the computer or other programmable data processing device to perform a series of operations for computer implemented processing. As such, the computer program instructions executed by the computer or other programmable data processing device implement provides the processes for implementing the functions specified in one or more processes of the flowcharts and/or one or more function blocks of the block diagrams.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Therefore, a true scope and spirit of the invention is indicated by the following claims.

What is claimed is:

1. An information processing method comprising:
    obtaining, by a processor of an electronic device, a target cover style of a first displayed video file;
    obtaining, by the processor, environment information of a video file in a preview state, wherein the preview state is a display state before the video file is played;
    in response to the environment information satisfying a first pre-set condition, indicating, by the processor, the video file by a first cover, determining a first cover style of the first cover matching the target cover style and indicating a to-be-displayed second video file by the first cover with the first cover style; and
    in response to the environment information satisfying a second pre-set condition, indicating, by the processor, the video file by a second cover, determine a second cover style of the second cover matching the target cover style and indicating a to-be-displayed second video file by the second cover with the second cover style,
    wherein:
    the environment information includes at least one of a file folder of the video file, scene information of an electronic device used to display the video file, an operating state of the electronic device, or attribute information of the video file; and the attribute information includes time information and/or type information.

2. The method according to claim 1, wherein obtaining the environment information of the video file in the preview state includes:
    obtaining, by the processor, respective environment information of a plurality of video files in a preview state and respective scenes represented by the plurality of video files; and
    correspondingly, indicating, by the processor, the video file by the first cover in response to the environment information satisfying the first pre-set condition and indicating, by the processor, the video file by the second cover in response to the environment information satisfying the second pre-set condition includes:
        in response to the environment information satisfying the first pre-set condition and the scenes represented by the plurality of video files are the same, indicating, by the processor, each video file respectively by the first cover of each of the plurality of video files sharing the same scene; and in response to the environment information satisfying the second pre-set condition and the scenes represented by the plurality of video files are the same, indicating, by the processor, each video file respectively by the second cover of each of the plurality of video files sharing the same scene.

3. The method according to claim 1, wherein obtaining the environment information of the video file in the preview state includes:

obtaining, by the processor, respective environment information of a plurality of video files in the preview state and respective capturing time of the plurality of video files, and determining, by the processor, multiple time groups corresponding to the capturing time of the plurality of video files; and correspondingly, indicating the video file by the first cover in response to the environment information satisfying the first pre-set condition and indicating the video file by the second cover in response to the environment information satisfying the second pre-set condition includes:

in response to the environment information satisfying the first pre-set condition, indicating, by the processor, each video file respectively by the first cover of each of the plurality of video files, and dividing the plurality of video files by the multiple time groups; and in response to the environment information satisfying the second pre-set condition, indicating, by the processor, each video file respectively by the second cover of each of the plurality of video files, and dividing, by the processor, the plurality of video files by the multiple time groups.

4. The method according to claim 1, wherein:

obtaining the environment information of the video file in the preview state includes:

obtaining, by the processor, respective environment information of a plurality of video files in the preview state and analyzing the plurality of video files to generate a plurality of first video description information corresponding to the plurality of video files, respectively; and correspondingly, indicating, by the processor, the video file by the first cover if the environment information satisfies the first pre-set condition and indicating the video file by the second cover if the environment information satisfies the second pre-set condition includes:

in response to the environment information satisfying the first pre-set condition, indicating, by the processor, each video file respectively by the first cover of each of the plurality of video files including first video description information; and in response to the environment information satisfying the second pre-set condition, indicating, by the processor, each video file respectively by the second cover of each of the plurality of video files including first video description information; and correspondingly, the method further includes:

receiving, by the processor, an editing operation for the first video description information of a first target video file among the plurality of video files, and in response to the editing operation, generating, by the processor, second video description information; and modifying, by the processor, the first video description information of the first target video file with the second video description information.

5. The method according to claim 4, where indicating each video file respectively by the first cover of each of the plurality of video files including the first video description information in response to the environment information satisfying the first pre-set condition and indicating each video file respectively by the second cover of each of the plurality of video files including the first video description information in response to the environment information satisfying the second pre-set condition includes:

based on the first video description information, determining, by the processor, a video label for the corresponding video file, each video label including at least one video type;

based on the video type, determining, by the processor, a video category for the corresponding video file;

in response to the environment information satisfying the first pre-set condition, indicating, by the processor, each video file by the first cover of each of the plurality of video files including the first video description information, and dividing the plurality of video files into groups according to the video category; and in response to the environment information satisfying the second pre-set condition, indicating, by the processor, each video file by the second cover of each of the plurality of video files including the first video description information, and dividing the plurality of video files into groups according to the video category.

6. The method according to claim 5, wherein:

indicating each video file by the first cover of each of the plurality of video files including the first video description information in response to the environment information satisfying the first pre-set condition and dividing the plurality of video files into groups according to the video category includes:

obtaining, by the processor, a capturing time of each of a plurality of third video files divided into different video categories and determining a time sub-category corresponding to the capturing time of the plurality of third video files; and in response to the environment information satisfying the first pre-set condition, indicating, by the processor, each video file by the first cover of each of the plurality of third video files including the first video description information, and dividing, by the processor, the plurality of third video files into groups according to the video category and the time sub-category; and correspondingly, indicating, by the processor, each video file by the second cover of each of the plurality of video files including the first video description information if the environment information satisfies the second pre-set condition and dividing, by the processor, the plurality of video files into groups according to the video category includes:

in response to the environment information satisfying the second pre-set condition, indicating, by the processor, each video file by the second cover of each of the plurality of third video files including the first video description information and dividing, by the processor, the plurality of third video files into groups according to the video category and the time sub-category.

7. The method according to claim 4, wherein:
indicating each video file respectively by the first cover of each of the plurality of video files including the first video description information in response to the environment information satisfying the first pre-set condition and indicating each video file respectively by the second cover of each of the plurality of video files including the first video description information if the environment information satisfies the second pre-set condition includes:
- based on the first video description information, determining, by the processor, a video label for the corresponding video file, each video label including at least one video type;
- in response to the environment information satisfying the first pre-set condition, indicating, by the processor, each video file by the first cover of each of the plurality of video files including the first video description information and the video label; and
- in response to the environment information satisfying the second pre-set condition, indicating, by the processor, each video file by the second cover of each of the plurality of video files including the first video description information and the video label; and correspondingly, the method further includes:
- receiving, by the processor, a pre-configured operation for the video label of a second target video file among the plurality of video files, and in response to the pre-configured operation, determining, by the processor, a target video type based on the video label;
- based on the target video type, extracting, by the processor, a target video cover corresponding to the target video type from the second target video file; and
- modifying, by the processor, the video cover of the second target video file with the target video cover.

8. The method according to claim 5, wherein determining the video label for the video file based on the first video description information includes:
- obtaining classifier including multiple video types and extracting feature information from a plurality of video files, by the processor;
- classifying, by the processor, the feature information with the classifier to obtain multiple first labels corresponding to the plurality of video files respectively, each first label including at least one first video type;
- in response to the first label corresponding to a third target video file among the plurality of video files matches the first video description information of the third target video file, determining, by the processor, that the first label is the video label of the third target video file; and
- in response to the first label corresponding to the third target video file among the plurality of video files does not match the first video description information of the third target video file, modifying, by the processor, the first label corresponding to the third target video file with the first video description information of the third target video file to obtain a second label, and determining, by the processor, that the second label is the video label of the third target video file, wherein:
- the second label includes at least one second video type; and
- the second label and the first label corresponding to the third target video file are different.

9. An electronic device comprising:
a memory for storing program instructions;
a processor coupled with the memory through a communication bus and configured to:
- obtain a target cover style of a first displayed video file;
- obtain environment information of a video file in a preview state, wherein the preview state is a display state before the video file is played;
- in response to the environment information satisfying a first pre-set condition, indicate the video file by a first cover, determine a first cover style of the first cover matching the target cover style and indicating a to-be-displayed second video file by the first cover with the first cover style; and
- in response to the environment information satisfying the second pre-set condition, indicate the video file by a second cover, determine a second cover style of the second cover matching the target cover style and indicating a to-be-displayed second video file by the second cover with the second cover style, wherein:
the environment information includes at least one of a file folder of the video file, scene information of an electronic device used to display the video file, an operating state of the electronic device, or attribute information of the video file; and the attribute information includes time information and/or type information.

10. The electronic device according to claim 9, wherein obtaining the environment information of the video file in the preview state includes:
- obtaining respective environment information of a plurality of video files in a preview state and respective scenes represented by the plurality of video files; and correspondingly, indicating the video file by the first cover if the environment information satisfies the first pre-set condition and indicating the video file by the second cover if the environment information satisfies the second pre-set condition includes:
- in response to the environment information satisfying the first pre-set condition and the scenes represented by the plurality of video files are the same, indicating each video file respectively by the first cover of each of the plurality of video files sharing the same scene; and
- in response to the environment information satisfying the second pre-set condition and the scenes represented by the plurality of video files are the same, indicating each video file respectively by the second cover of each of the plurality of video files sharing the same scene.

11. A non-transitory computer readable medium containing program instructions, when executed by one or more processors, the program instructions perform a method comprising:
- obtaining a target cover style of a first displayed video file;
- obtaining environment information of a video file in a preview state, wherein the preview state is a display state before the video file is played;
- in response to the environment information satisfying a first pre-set condition, indicating the video file by a first cover, determining a first cover style of the first cover matching the target cover style and indicating a to-be-displayed second video file by the first cover with the first cover style; and
- in response to the environment information satisfying a second pre-set condition, indicating the video file by a second cover, determine a second cover style of the second cover matching the target cover style and indicate a to-be-displayed second video file by the second cover with the second cover style;

wherein:

the environment information includes at least one of a file folder of the video file, scene information of an electronic device used to display the video file, an operating state of the electronic device, or attribute information of the video file; and the attribute information includes time information and/or type information.

12. The non-transitory computer readable medium according to claim 11, wherein obtaining the environment information of the video file in the preview state includes:

obtaining respective environment information of a plurality of video files in a preview state and respective scenes represented by the plurality of video files; and correspondingly, indicating the video file by the first cover in response to the environment information satisfying the first pre-set condition and indicating the video file by the second cover in response to the environment information satisfying the second pre-set condition includes:

in response to the environment information satisfying the first pre-set condition and the scenes represented by the plurality of video files are the same, indicating each video file respectively by the first cover of each of the plurality of video files sharing the same scene; and in response to the environment information satisfying the second pre-set condition and the scenes represented by the plurality of video files are the same, indicating each video file respectively by the second cover of each of the plurality of video files sharing the same scene.

13. The non-transitory computer readable medium according to claim 11, wherein obtaining the environment information of the video file in the preview state includes:

obtaining respective environment information of a plurality of video files in the preview state and respective capturing time of the plurality of video files, and determining multiple time groups corresponding to the capturing time of the plurality of video files; and correspondingly, indicating the video file by the first cover in response to the environment information satisfying the first pre-set condition and indicating the video file by the second cover in response to the environment information satisfying the second pre-set condition includes:

in response to the environment information satisfying the first pre-set condition, indicating each video file respectively by the first cover of each of the plurality of video files, and dividing the plurality of video files by the multiple time groups; and in response to the environment information satisfying the second pre-set condition, indicating each video file respectively by the second cover of each of the plurality of video files, and dividing the plurality of video files by the multiple time groups.

14. The non-transitory computer readable medium according to claim 11, wherein:

obtaining the environment information of the video file in the preview state includes:

obtaining respective environment information of a plurality of video files in the preview state and analyzing the plurality of video files to generate a plurality of first video description information corresponding to the plurality of video files, respectively; and correspondingly, indicating the video file by the first cover if the environment information satisfies the first pre-set condition and indicating the video file by the second cover if the environment information satisfies the second pre-set condition includes:

in response to the environment information satisfying the first pre-set condition, indicating each video file respectively by the first cover of each of the plurality of video files including first video description information; and in response to the environment information satisfying the second pre-set condition, indicating each video file respectively by the second cover of each of the plurality of video files including first video description information; and correspondingly, the method further includes:

receiving an editing operation for the first video description information of a first target video file among the plurality of video files, and in response to the editing operation, generating second video description information; and modifying the first video description information of the first target video file with the second video description information.

15. The non-transitory computer readable medium according to claim 14, where indicating each video file respectively by the first cover of each of the plurality of video files including the first video description information in response to the environment information satisfying the first pre-set condition and indicating each video file respectively by the second cover of each of the plurality of video files including the first video description information in response to the environment information satisfying the second pre-set condition includes:

based on the first video description information, determining a video label for the corresponding video file, each video label including at least one video type;

based on the video type, determining a video category for the corresponding video file;

in response to the environment information satisfying the first pre-set condition, indicating each video file by the first cover of each of the plurality of video files including the first video description information, and dividing the plurality of video files into groups according to the video category; and in response to the environment information satisfying the second pre-set condition, indicating each video file by the second cover of each of the plurality of video files including the first video description information, and dividing the plurality of video files into groups according to the video category.

16. The non-transitory computer readable medium according to claim 15, wherein:

indicating each video file by the first cover of each of the plurality of video files including the first video description information in response to the environment information satisfying the first pre-set condition and dividing the plurality of video files into groups according to the video category includes:

obtaining a capturing time of each of a plurality of third video files divided into different video categories and determining a time sub-category corresponding to the capturing time of the plurality of third video files; and in response to the environment information satisfying the first pre-set condition, indicating each video file by the first cover of each of the plurality of third video files including the first video description information, and dividing the plurality of third video files into groups according to the video category and the time sub-category; and correspondingly, indicating each video file by the second cover of each of the plurality of video files including the first video description information if the environment information satisfies the second pre-set condition and dividing the plurality of video files into groups according to the video category includes:

in response to the environment information satisfying the second pre-set condition, indicating each video file by the second cover of each of the plurality of third video files including the first video description information and dividing the plurality of third video files into groups according to the video category and the time sub-category.

\* \* \* \* \*